United States Patent
Ensor et al.

(10) Patent No.: US 10,581,769 B2
(45) Date of Patent: Mar. 3, 2020

(54) INTEGRATING THIRD-PARTY PROGRAMS WITH MESSAGING SYSTEMS

(71) Applicant: Alcatel-Lucent USA Inc., Murray Hill, NJ (US)

(72) Inventors: James R. Ensor, Red Bank, NJ (US); Markus A. Hofmann, Fair Haven, NJ (US); Fei Yu, San Francisco, CA (US)

(73) Assignee: Nokia of America Corporation, Murray Hill, NJ (US)

( * ) Notice: Subject to any disclaimer, the term of this patent is extended or adjusted under 35 U.S.C. 154(b) by 46 days.

(21) Appl. No.: 15/208,877

(22) Filed: Jul. 13, 2016

(65) Prior Publication Data
US 2018/0018972 A1    Jan. 18, 2018

(51) Int. Cl.
```
H04L 12/58      (2006.01)
H04L 12/18      (2006.01)
G06F 17/28      (2006.01)
G10L 17/22      (2013.01)
H04L 29/08      (2006.01)
G10L 15/08      (2006.01)
G10L 15/22      (2006.01)
```

(52) U.S. Cl.
CPC ........... H04L 51/046 (2013.01); G06F 17/28 (2013.01); G10L 17/22 (2013.01); H04L 12/1822 (2013.01); H04L 51/02 (2013.01); H04L 67/20 (2013.01); G10L 2015/088 (2013.01); G10L 2015/228 (2013.01)

(58) Field of Classification Search
CPC ....................................................... H04L 51/046
USPC ............................................................. 715/758
See application file for complete search history.

(56) References Cited

U.S. PATENT DOCUMENTS

| | | | | |
|---|---|---|---|---|
| 8,683,355 | B1 * | 3/2014 | Gailloux | H04L 51/10 709/204 |
| 8,838,459 | B2 * | 9/2014 | Uszkoreit | G06F 17/289 379/202.01 |
| 8,935,755 | B1 * | 1/2015 | Kay | G06F 16/9535 726/4 |
| 2005/0138132 | A1 | 6/2005 | Zhou et al. | |
| 2007/0198647 | A1 * | 8/2007 | Lingafelt | H04L 12/1822 709/207 |
| 2008/0201434 | A1 * | 8/2008 | Holmes | G06Q 10/10 709/206 |
| 2008/0240379 | A1 * | 10/2008 | Maislos | G06F 17/30855 379/88.13 |

(Continued)

OTHER PUBLICATIONS

PCT Written Opinion and International Search Report dated Oct. 17, 2017 from International Application No. PCT/US2017/040787 filed Jul. 6, 2017.

*Primary Examiner* — Shaun Roberts
(74) *Attorney, Agent, or Firm* — Chiesa Shahinian & Giantomasi PC (57) ABSTRACT

Systems and methods for invoking a third-party program as an additional participant of a chat session include monitoring events of a chat session of a messaging platform. At least one of the events of the chat session is determined to satisfy a triggering condition associated with a third-party program. In response to determining that the at least one of the events of the chat session satisfies the triggering condition associated with the third-party program, the third-party program is invoked as an additional participant of the chat session.

20 Claims, 4 Drawing Sheets

(56) References Cited

U.S. PATENT DOCUMENTS

| | | | |
|---|---|---|---|
| 2009/0094536 A1* | 4/2009 | Keohane | G06Q 10/107 |
| | | | 715/758 |
| 2011/0029892 A1* | 2/2011 | Kurtz | G06Q 10/107 |
| | | | 715/752 |
| 2016/0021038 A1 | 1/2016 | Woo et al. | |
| 2016/0099892 A1 | 4/2016 | Palakovich et al. | |
| 2016/0188671 A1* | 6/2016 | Gupta | G06F 17/30528 |
| | | | 707/722 |

* cited by examiner

| Third-Party Program | Triggering Condition |
|---|---|
| Weather | Keyword: weather |
| Translator | Detect foreign language |
| ⋮ | ⋮ |

```
┌─────────────────────────────────────────────────────────┐
│   Monitoring events of a chat session of a messaging platform. │
│                            302                          │
└─────────────────────────────────────────────────────────┘
                              │
                              ▼
┌─────────────────────────────────────────────────────────┐
│   Determining that at least one of the events of the chat session │
│   satisfies a triggering condition associated with a third-party │
│                          program                        │
│                            304                          │
└─────────────────────────────────────────────────────────┘
                              │
                              ▼
┌─────────────────────────────────────────────────────────┐
│   In response to determining that the at least one of the events │
│   satisfies the triggering condition associated with the third-party │
│   program, invoking the third-party program as an additional │
│              participant of the chat session            │
│                            306                          │
└─────────────────────────────────────────────────────────┘
```

FIG. 3

FIG. 4

INTEGRATING THIRD-PARTY PROGRAMS WITH MESSAGING SYSTEMS

BACKGROUND OF THE INVENTION

The present invention relates generally to messaging systems and more particularly to integrating third-party programs with messaging systems.

Messaging systems allow users or participants to communicate with each other by exchanging messages in a chat session. However, participants of a chat session do not have to be people. For example, many messaging systems allow third-party programs to act as participants in a chat session. Third-party programs are automated programs that interact with other participants in a chat session. Third-party programs may operate accounts of the messaging system. Third-party programs may receive messages from participants and perform functions based on the received messages. Third-party programs may also be referred to as bots, official accounts, and software chat buddies.

A user may wish to invoke third-party programs as participants in a chat session to provide customized functions, such as, e.g., providing relevant news articles, providing supplemental content, playing a game, etc. Conventionally, a user seeking to invoke a third-party program as a participant in a chat session must locate the third-party program in an app store of the messaging system. Such a discovery process to locate the third-party program in the app store typically involves a search mechanism or traversal of a category tree. These conventional approaches for locating third-party programs are often inconvenient, difficult, and yield inaccurate results.

BRIEF SUMMARY OF THE INVENTION

In accordance with an embodiment, systems and methods for invoking a third-party program as an additional participant of a chat session include registering the third-party program with a triggering condition. The triggering condition comprises at least one of an event, a criteria, or a state relating to the chat session, such as, e.g., a keyword referred to in the chat session. The third-party program is registered with a triggering condition by receiving the triggering condition from an entity associated with the third-party program and storing the associated between the triggering condition and the third-party program in a registry.

Events of the chat session of the messaging platform are monitored. At least one of the events of the chat session is determined to satisfy a triggering condition associated with a third-party program. For example, the association between the triggering condition and the third-party program may be retrieved from the registry and the at least one of the events is compared with the triggering condition to determine that the at least one of the events of the chat session satisfies the triggering condition associated with the third-party program. In response to determining that the at least one of the events of the chat session satisfies the triggering condition associated with the third-party program, the third-party program is invoked as an additional participant of the chat session.

In accordance with an embodiment, invoking the third-party program as an additional participant of the chat session includes sending a notification to the third-party program, receiving a response from the third-party program indicating its interest in being invoked, presenting the third-party program to an existing participant of the chat session based on the response, and receiving input from the existing participant to invite the third-party program as an additional participant of the chat session. The response from the third-party program may include services provided by the third-party program. The services provided by the third-party program may be presented to the existing participant. The notification is sent to the third-party program if the third-party program satisfies a selection criteria.

In accordance with an embodiment, invoking the third-party program as an additional participant of the chat session includes presenting the third-party program to an existing participant of the chat session, and receiving input from the existing participant to invoke the third-party program as an additional participant of the chat session.

These and other advantages of the invention will be apparent to those of ordinary skill in the art by reference to the following detailed description and the accompanying drawings.

DETAILED DESCRIPTION

Figure 1:
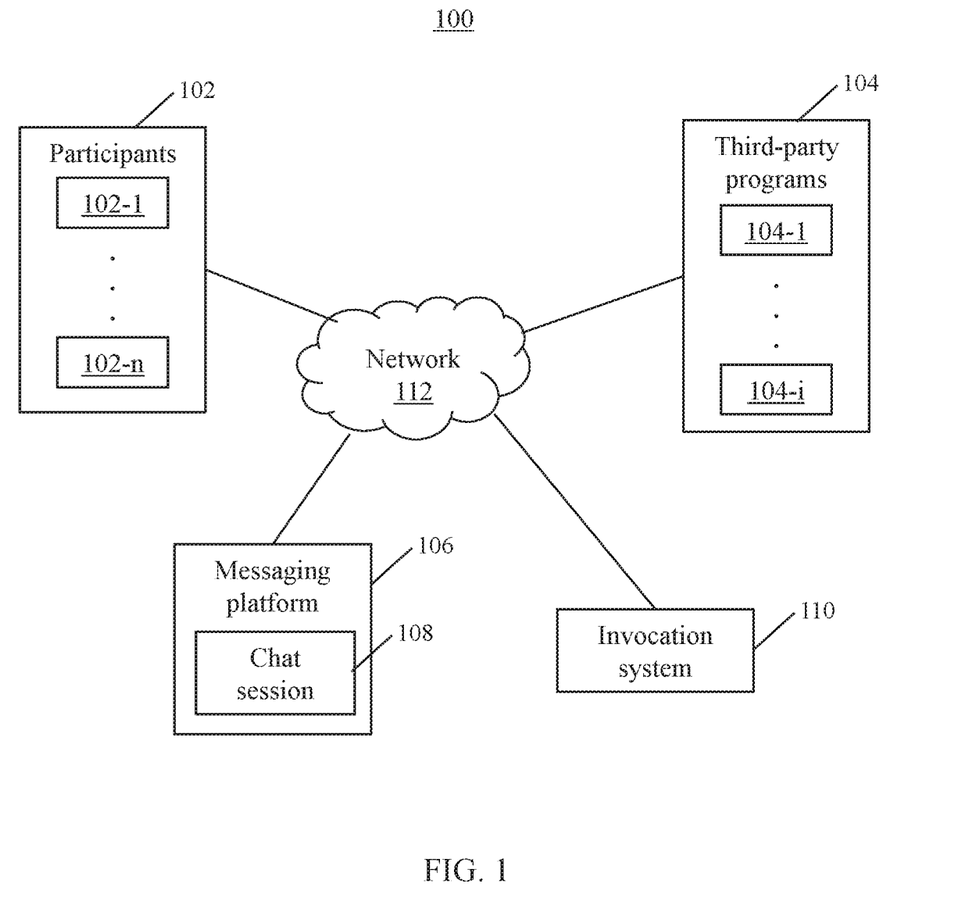
FIG. 1 shows a high-level overview of a communications system, in accordance with one or more embodiments.

FIG. 1 shows a high-level overview of a communications system 100, in accordance with one or more embodiments. Communications system 100 includes one or more users or participants 102-1, ..., 102-n (collectively referred to as participants 102). Participants 102 may exchange messages with each other in a chat session 108 executing on a messaging platform 106 via computing devices (not shown) communicatively coupled to a network 112. Network 112 may include any type of network or combinations of different types of networks. For example, network 112 may include the Internet, an intranet, a local area network (LAN), a wide area network (WAN), a wired and/or wireless network, a Fibre Channel storage area network (SAN), a cellular communications network, etc. Other types of networks are also contemplated.

During chat session 108, participants 102 may find it desirable to invoke one or more third-party programs 104-1, ..., 104-i (collectively referred to as third-party programs 104) as additional participants of chat session 108 due to the functionality that third-party programs 104 provide. Third-party programs 104 are automated programs that interact with participants 102 in chat session 108. Third-party programs 104 may operate accounts of messaging platform 106. Third-party programs 104 may provide various functions to chat session 108. Exemplary functions of third-party programs 104 may include displaying a weather forecast, translating messages, facilitating the playing of games, and providing supplemental content. Third-party programs 104 may be referred to by different names by different messaging platforms. For example, third party programs 104 may also be referred to as bots, official accounts, and software chat buddies.

Conventionally, participants locate third-party programs in an app store (e.g., an app store of a messaging platform). This typically involves a search mechanism or traversing a category tree, which can be inconvenient, difficult, and yield inaccurate results.

Advantageously, invocation system 110 provides for an automatic process for identifying third-party programs 104. Invocation system 110 invokes third-party programs 104 as additional participants in an existing chat session 108. Invocation system 110 is discussed in more detail with respect to FIGS. 2A and 2B.

Figure 2A:
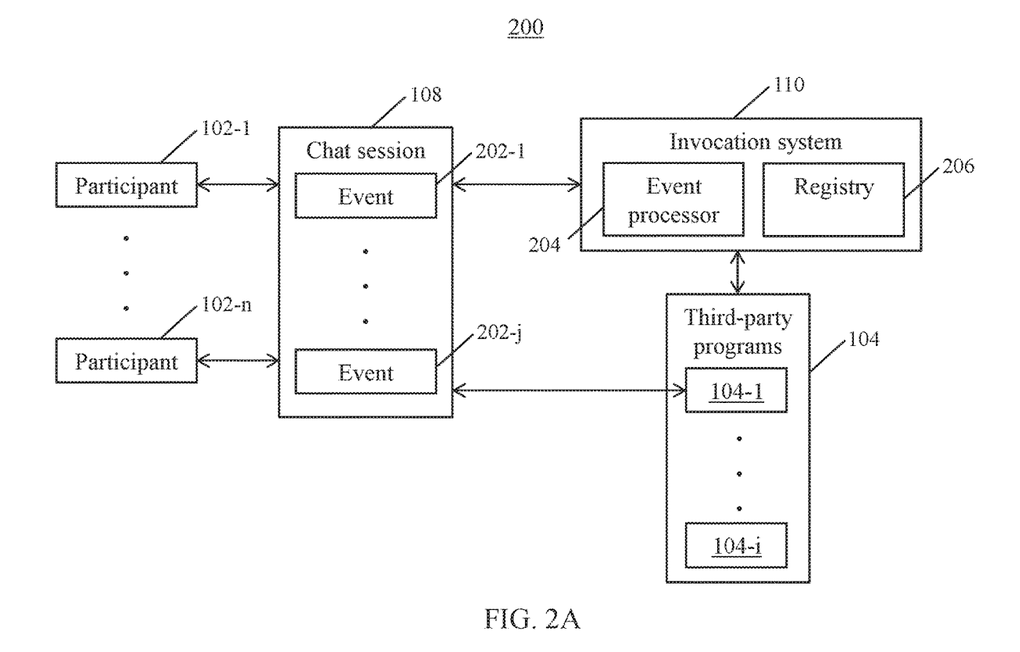
FIG. 2A shows a detailed view of an architecture for discovery and invocation of third-party programs in a chat session, in accordance with one or more embodiments.

FIG. 2A shows a detailed view of an architecture 200 for implementing a messaging platform, in accordance with one or more embodiments. Architecture 200 includes invocation system 110 to facilitate the identification of third-party programs 104 and to facilitate the invocation of third-party programs 104 as additional participants in an existing chat session 108.

Invocation system 110 includes a registry 206 for registering one or more third-party programs 104. For example, third-party programs 104 may be registered with registry 206 by developers of third-party programs 104. Registry 206 registers each of the third-party programs 104 with one or more associated triggering conditions. The triggering conditions represent an event, criteria, or state related to chat session 108 that triggers invocation of the associated third-party program 104 as an additional participant in chat session 108. For example, the triggering condition may be that it is raining at a location of a participant 102 or that a participant 102 references a keyword within chat session 108. In one embodiment, the triggering conditions are registered in registry 206 as tags (e.g., words) associated with a third-party program 104. The triggering conditions reflect third-party program 104's "interest" in an event, condition, or state that occurs within or otherwise relate to chat session 108 and therefore may be relevant to participants 102.

Figure 2B:
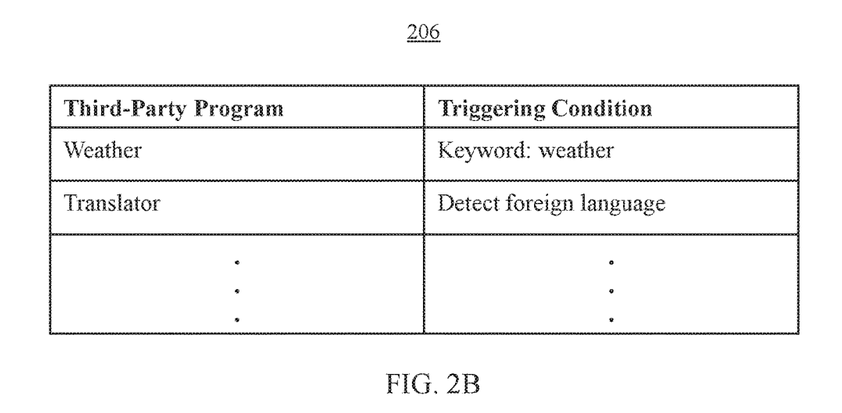
FIG. 2B shows detailed view of the registry, in accordance with one or more embodiments.

FIG. 2B shows a detailed view of registry 206, in accordance with one or more embodiments. Registry 206 includes a database or table of registered third-party programs 104 with one or more associated triggering conditions. In the example shown in registry 206 of FIG. 2B, third-party program 104 called "Weather" includes a triggering condition comprising a keyword, weather, being referenced in chat session 108. Also shown in registry 206 of FIG. 2B, third-party program 104 called "Translator" includes a triggering condition comprising the detection of a foreign language in chat session 108 (i.e., a language different from what is predominantly used in chat session 108).

As participants 102 participate in chat session 108 in FIG. 2A, events 202-1, . . . , 202-j (collectively events 202) of chat session 108 are generated. For example, in one embodiment, events 202 may be generated by messaging platform 106 using known techniques. Events 202 may include any event relating to chat session 108. Examples of events 202 may include a reference to a keyword by a participant 102, information extracted from a website linked by a participant 102, location information of a participant 102 of chat session 108, detection of a foreign language message sent by a participant 102 in chat session 108, etc. Event processor 204 receives events 202 and analyzes events 202 to determine whether one or more events 202 satisfy a triggering condition associated third-party programs 104 in registry 206.

Where event processor 204 determines that an event 202 satisfies a triggering condition associated with a third-party program 104, the third-party program 104 is invoked as an additional participant of chat session 108. Invoking the third-party program 104 as an additional participant of chat session 108 may involve causing the third-party program 104 to execute (if not already executing) and joining the executing third-party program 104 as an additional participant of chat session 108.

Event processor 204 may invoke a third-party program 104 as an additional participant of chat session 108 through one or more mechanisms. These mechanisms include, but are not limited to, sending a message to an already-executing third-party program 104 (i.e., one that is either in an active or suspended state), sending a message to an operating system to start execution of a third-party program 104, sending a message to a computing cloud to start execution of a third-party program 104 on a virtual machine. Once a third-party program 104 is executing on behalf (i.e., in response to an invocation mechanism) of invocation system 110, the third-party program 104 may join chat session 108 as an additional participant through a variety of joining procedures. In some embodiments, the message sent for executing the third-party program 104 includes information needed for the third-party program 104 to join chat session 108 and to carry out appropriate actions during the session (e.g., data associated with a triggering event).

In a first embodiment for invoking a third-party program 104 as an additional participant of chat session 108, where event processor 204 determines that an event 202 satisfies a triggering condition associated with a third-party program 104, event processor 204 sends a notification to the third-party program 104. The notification may include an indication that the third-party program 104 is associated with a triggering condition that is satisfied by an event 202. In some embodiments, the notification is only sent to the third-party program 104 if the third-party program 104 satisfies one or more selection criteria. As such, only third-party programs 104 that satisfy the selection criteria may join chat session 108 as an additional participant. Exemplary selection criteria include being ranked among the top third-party programs, having a particular rating, having a particular number of reviews, having a particular number of users, having a particular number of invocations, or any other suitable selection criteria.

In response to the notification, the third-party program 104 associated with a satisfied triggering condition sends a response to event processor 204 indicating the third-party program's 104 interest in being invoked as an additional participant of chat session 108. In one example, the response is an affirmative or a negative (e.g., a yes or no) indicating the third-party program's 104 interest in being invoked as an additional participant of chat session 108. In another example, only affirmative responses (i.e., indicating that the third-party program 104 is interested in being invoked as an additional participant) are sent. The response may also include information relating to services the third-party program 104 can provide.

The third-party program 104, which responds with an affirmative indication that it is interested in being invoked as an additional participant of chat session 108, is classified, ranked, and/or filtered according to various additional criteria by event processor 204 (i.e., classified, ranked, and/or filtered along with other third-party programs 104 associated with a satisfied triggering condition and that respond with an indication that they are interested in being invoked). For example, the various additional criteria may be based on, e.g., a rank of the third-party program 104, a particular rating of the third-party program 104, a number of reviews of the third-party program 104, a particular number of users of the third-party program 104, and a particular number of invocations of the third-party program 104.

Event processor 204 presents the third-party program 104 to participants 102 of chat session 108 according to a presentation policy. The presentation policy defines how the third-party program 104 is to be presented to participants 102 based on the classifying, ranking, and/or filtering. For example, the presentation policy may indicate that the third-party program 104 is to be presented (along with other third-party programs 104 satisfying the requirements described herein) in an ordered array. The array may be ordered based on the classifying, ranking, and/or filtering (e.g., based on rank, rating, number of reviews, number of users, number of invocations, etc.).

The presentation policies for presenting the third-party program 104 to participants 102 may be implemented to create a business framework supporting sponsored third-party programs. The third-party program 104, which responds with an indication that it is interested in being invoked as an additional participant of chat session 108, is classified, ranked, and/or filtered according to various additional business-sensitive criteria by event processor 204. For example, the various additional criteria may be based on, e.g., payments from the provider of the third-party program 104 to the provider of event processor 204 for preferential presentation. Paying for preferential handling of third-party programs can be used for various business purposes. For example, an advertising campaign might use a prominent program presentation as a way to increase visibility and awareness of a program or associated services. Such sponsored third-party programs may represent, for example, sports teams, television shows, movies, retailers, etc. by presenting advertisements, applications, or services associated with their sponsors.

In some embodiments, only a subset of third-party programs 104 is presented in the array to participants 102. The subset may be determined based on the classifying, ranking, and/or filtering (e.g., only the top three ranked third-party programs 104). The third-party program 104 may be presented with descriptions of the third-party program 104. The descriptions may include services provided by the third-party programs 104 that were received in the response.

A participant 102 may then select third-party program 104 to invoke or invite as an additional participant of chat session 108. In response, event processor 204 causes the selected third-party program 104 to be executed (if not already executing). Event processor 204 also sends information to the selected third-party program 104 that it needs to join chat session 108. This information may also include data (e.g., parameters) needed for the third-party program 104 to carry out appropriate actions during chat session 108. For example, the information may include data associated with a triggering event.

In one embodiment, instead of event processor 204 sending information to the selected third-party program 104 that it needs to join chat session 108, where event processor 204 sends a message to an operating system requesting that it begin the execution of the selected third-party program 104, the message sent to the operating system for execution of the selected third-party program 104 also includes information that enables the now executing third-party program 104 to join chat session 108 and data needed for the third-party program 104 to carry out appropriate actions during chat session 108.

Once the third-party program 104 has joined chat session 108 as an additional participant, third-party program 104 may provide/exchange information to/with other participants 102 and/or third-party programs 104.

In a second embodiment for invoking a third-party program 104 as an additional participant of chat session 108, in response to event processor 204 determining that an event 202 satisfies a triggering condition associated with a third-party program 104, event processor 204 presents the third-party program 104 associated with a satisfied triggering condition to participants 102 of chat session 108 (i.e., without first sending a notification to the third-party program 104). The event processor 204 may present third-party program 104 according to the presentation policy with descriptions of the third-party program 104. A participant 102 may then select or otherwise approve or disapprove of the third-party program 104 being invoked as an additional participant in chat session 108. In response, event processor 204 causes the selected third-party program 104 to be executed (if not already executing) and sends a notification to the selected third-party program 104 to invite the third-party program 104 as an additional participant in chat session 108. The notification may include information that the third-party program 104 needs to join chat session 108. This information may also include data needed for the third-party program 104 to carry out appropriate actions during chat session 108 (e.g., data associated with a triggering event). Once the third-party program 104 has joined chat session 108 as an additional participant, third-party program 104 may provide/exchange information to/with other participants 102 and/or third-party programs 104.

In a third embodiment for invoking a third-party program 104 as an additional participant of chat session 108, the third-party program 104 that is associated with a satisfied triggering condition is automatically invoked as an additional participant of chat session 108, without any input from participants 102. For example, event processor 204 may automatically cause the third-party program 104 to be executed (if not already executing) and send a notification to the third-party program 104 to join the third-party program 104 as an additional participant in chat session 108. The notification may include information that the third-party program 104 that it needs to join chat session 108 and data needed for the third-party program 104 to carry out appropriate actions during chat session 108. In still other embodiments, events 202 are used to automatically begin execution of a third-party program 104 in a new chat session. Advantageously, invocation system 110 allows a simpler and more convenient approach for invoking third-party programs 104 as additional participants in an existing chat session 108. Invocation system 110 also reduces the cost to develop third-party programs 104 by establishing a framework in which third-party programs 104 can be discovered and invoked, thereby simplifying the coding of third-party programs 104. Invocation system 110 further increases the value of third-party programs 104 by allowing a given third-party program 104 to be more easily located and used by other applications.

Invocation system 110 also allows third-party programs 104 to publish their identities in terms of functions they perform and the trigger conditions that trigger their invocation. Thus, third-party programs 104 can be discovered by searching their published characteristics. Other applications can search for third-party programs 104 not only by name, but also by the function that they perform in order to trigger the invocation of a third-party program 104.

Figure 3:
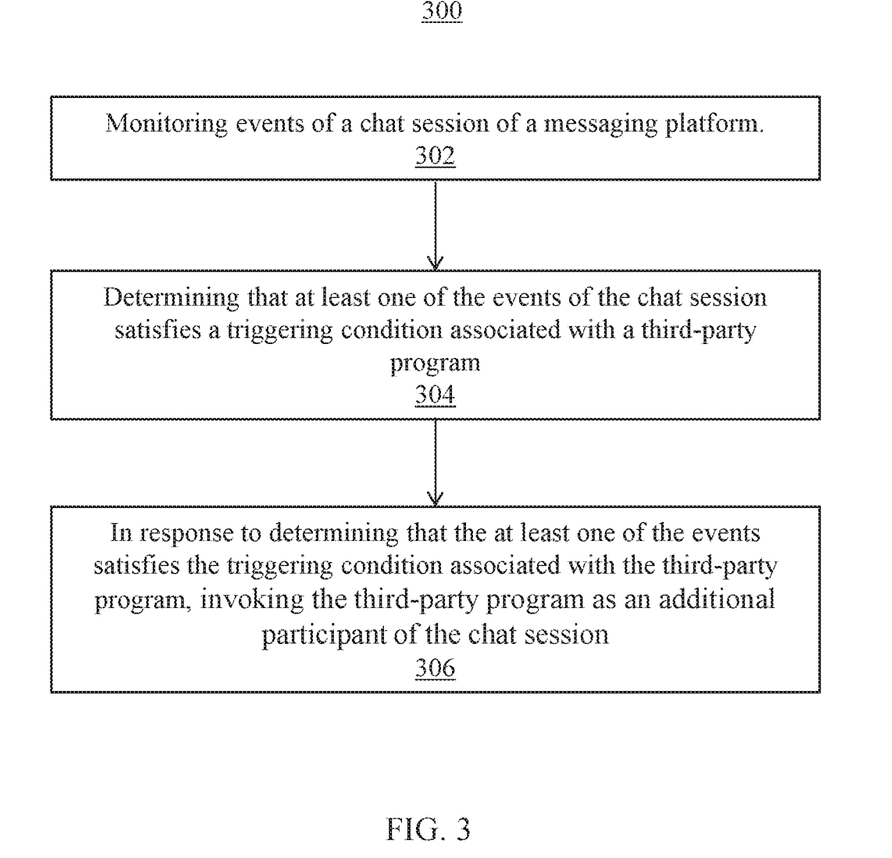
FIG. 3 shows a flow diagram of a method for discovery and invocation of third-party programs in a chat session, in accordance with one or more embodiments.

FIG. 3 shows a flow diagram of a method 300 for invoking a third-party program as an additional participant of a chat session, in accordance with one or more embodiments. Method 300 may be performed, e.g., by invocation system 110 illustratively depicted in FIGS. 1 and 2A.

At step 302, events of a chat session of a messaging platform are monitored. In one embodiment, the events may be generated by the messaging platform using known methods. The events may include states or actions occurring in the chat session.

At step 304, it is determined that at least one of the events of the chat session satisfies a triggering condition associated with a third-party program. The triggering condition may represent an event, criteria, or state related to a chat session of the messaging platform. For example, the triggering condition may be a keyword referred to by a participant of the chat session. The third-party program may have been registered with the triggering condition as an initial step to method 300. Registering the third-party program with the triggering condition may include receiving the triggering condition from an entity associated with the third-party program and storing the association between the triggering condition and the third party program in a registry. The entity associated with the third-party program may include, for example, a developer of the third-party program, the third-party program itself, or any other entity. It is determined that at least one of the events of the chat session satisfies a triggering condition associated with a third-party program by retrieving the association between the triggering condition and the third-party program from the registry and comparing the at least one of the events with the triggering condition to determine that the at least one of the events of the chat session satisfies the triggering condition associated with the third-party program.

At step 306, in response to determining that the at least one of the events satisfies the triggering condition associated with a third-party program, the third-party program is invoked as an additional participant of the chat session. Invoking the third-party program as an additional participant may include causing the third-party program to be executed (if not already executed) and joining the executed third-party program as an additional participant of the chat session.

In one embodiment, the third-party program is invoked as an additional participant by sending a notification to the third-party program indicating that the triggering condition is satisfied. A response is received from the third-party program which indicates its interest in being invoked. The response may include information relating to services that the third-party program can provide. The third-party program may be presented to an existing participant of the chat session. For example, a description of the third-party program may be displayed to the existing participant. The description may include the services that the third-party program can provide that was received in the response. Input is received from the existing participant to invoke the third-party program as an additional participant of the chat session.

In another embodiment, the third-party program is invoked as an additional participant by presenting the third-party program (e.g., descriptions of the third-party program) to an existing participant of the chat session. Input is then received from the existing participant to invoke the third-party program as an additional participant in the chat session.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 3. Certain steps of the methods described herein, including one or more of the steps of FIG. 3, may be performed by a server or by another processor in a network-based cloud-computing system. Certain steps of the methods described herein, including one or more of the steps of FIG. 3, may be performed by a client computer in a network-based cloud computing system. The steps of the methods described herein, including one or more of the steps of FIG. 3, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 4:
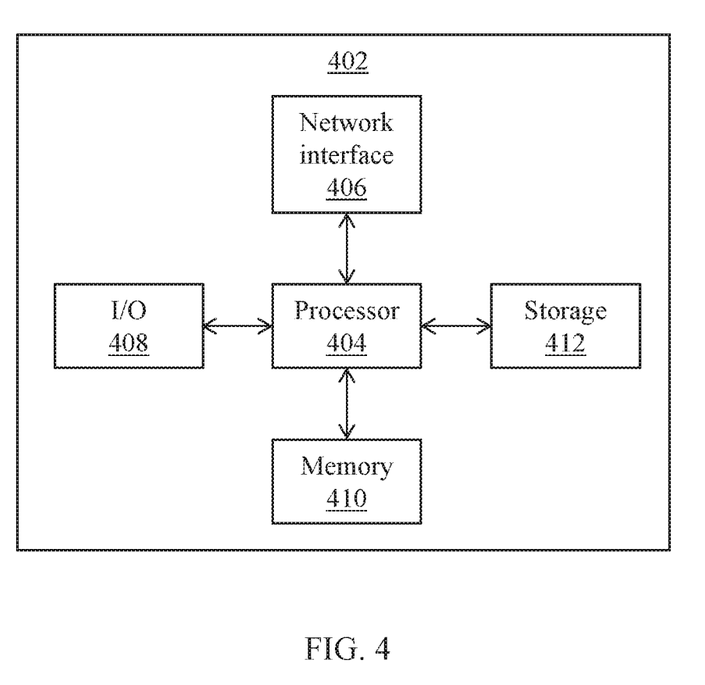
FIG. 4 shows a high-level block diagram of a computer for discovery and invocation of third-party programs in a chat session, in accordance with one or more embodiments.

A high-level block diagram 400 of an example computer that may be used to implement systems, apparatus, and methods described herein is depicted in FIG. 3. Computer 402 includes a processor 404 operatively coupled to a data storage device 412 and a memory 410. Processor 404 controls the overall operation of computer 402 by executing computer program instructions that define such operations. The computer program instructions may be stored in data storage device 412, or other computer readable medium, and loaded into memory 410 when execution of the computer program instructions is desired. Thus, the method steps of FIG. 3 can be defined by the computer program instructions stored in memory 410 and/or data storage device 412 and controlled by processor 404 executing the computer program instructions. For example, the computer program instructions can be implemented as computer executable code programmed by one skilled in the art to perform the method steps of FIG. 3. Accordingly, by executing the computer program instructions, the processor 404 executes the method steps of FIG. 3. Computer 402 may also include one or more network interfaces 406 for communicating with other devices via a network. Computer 402 may also include one or more input/output devices 908 that enable user interaction with computer 402 (e.g., display, keyboard, mouse, speakers, buttons, etc.).

Processor 404 may include both general and special purpose microprocessors, and may be the sole processor or one of multiple processors of computer 402. Processor 404 may include one or more central processing units (CPUs), for example. Processor 404, data storage device 412, and/or memory 410 may include, be supplemented by, or incorporated in, one or more application-specific integrated circuits (ASICs) and/or one or more field programmable gate arrays (FPGAs).

Data storage device 412 and memory 410 each include a tangible non-transitory computer readable storage medium. Data storage device 412, and memory 410, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 408 may include peripherals, such as a printer, scanner, display screen, etc. For example, input/output devices 408 may include a display device such as a cathode ray tube (CRT) or liquid crystal display (LCD) monitor for displaying information to the user, a keyboard, and a pointing device such as a mouse or a trackball by which the user can provide input to computer 402.

Any or all of the systems and apparatus discussed herein, including elements of invocation system 110 of FIGS. 1 and 2A, may be implemented using one or more computers such as computer 402.

One skilled in the art will recognize that an implementation of an actual computer or computer system may have other structures and may contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for invoking a third-party program as an additional participant of a chat session, comprising:
    monitoring events of an existing chat session of a messaging platform;
    determining that at least one of the events of the existing chat session satisfies a triggering condition;
    identifying a plurality of third-party programs associated with the triggering condition;
    transmitting a notification to each of the identified third-party programs indicating that the identified third-party program is associated with the triggering condition satisfied by the at least one of the events;
    receiving a response from responding third-party programs indicating that the responding third-party program is interested in being invoked as an additional participant in the existing chat session;
    ranking and filtering the responding third-party programs based on a selection criteria to determine a ranked subset of the responding third-party programs;
    presenting the ranked subset of the responding third-party programs to an existing participant of the existing chat session based on the selection criteria;
    in response to receiving a selection of one of the responding third-party programs from the existing participant of the existing chat session, invoking the selected third-party program as the additional participant of the existing chat session; and
    sending data associated with the at least one of the events of the existing chat session to the selected third-party program, wherein the selected third-party program performs a function in the existing chat session based on 1) the data associated with the at least one of the events and 2) interactions between the selected third-party program and the existing participant in the existing chat session.

2. The method as recited in claim 1, further comprising:
    registering the plurality of third-party programs with the triggering condition.

3. The method as recited in claim 2, wherein:
    registering the third plurality of third-party programs with the triggering condition comprises:
        receiving the triggering condition from an entity associated with the plurality of third-party programs; and
        storing the association between the triggering condition and the plurality of third-party programs in a registry; and
    identifying a plurality of third-party programs associated with the triggering condition comprises:
        comparing the at least one of the events with the triggering condition.

4. The method as recited in claim 1, wherein the response from the responding third-party programs comprises services provided by the responding third-party program.

5. The method as recited in claim 1, wherein the triggering condition comprises at least one of an event, a criteria, or a state relating to the existing chat session.

6. The method as recited in claim 1, wherein the triggering condition comprises a keyword referred to in the existing chat session.

7. The method of claim 1, wherein the triggering condition comprises a detection of a foreign language in the existing chat session.

8. The method of claim 1, wherein the triggering condition comprises weather at a location of the existing participant.

9. A non-transitory computer readable medium storing computer program instructions for invoking a third-party program as an additional participant of a chat session, which, when executed on a processor, cause the processor to perform operations comprising:

monitoring events of an existing chat session of a messaging platform;

determining that at least one of the events of the existing chat session satisfies a triggering condition;

identifying a plurality of third-party programs associated with the triggering condition;

transmitting a notification to each of the identified third-party programs indicating that the identified third-party program is associated with the triggering condition satisfied by the at least one of the events;

receiving a response from responding third-party programs indicating that the responding third-party program is interested in being invoked as an additional participant in the existing chat session;

ranking and filtering the responding third-party programs based on a selection criteria to determine a ranked subset of the responding third-party programs;

presenting the ranked subset of the responding third-party programs to an existing participant of the existing chat session based on the selection criteria;

in response to receiving a selection of one of the responding third-party programs from the existing participant of the existing chat session, invoking the selected third-party program as the additional participant of the existing chat session; and     sending data associated with the at least one of the events of the existing chat session to the selected third-party program, wherein the selected third-party program performs a function in the existing chat session based on 1) the data associated with the at least one of the events and 2) interactions between the selected third-party program and the existing participant in the existing chat session.

10. The non-transitory computer readable medium as recited in claim 9, the operations further comprising:

registering the plurality of third-party programs with the triggering condition.

11. The non-transitory computer readable medium as recited in claim 10, wherein:

registering the plurality of third-party programs with the triggering condition comprises:

receiving the triggering condition from an entity associated with the plurality of third-party programs; and         storing the association between the triggering condition and the plurality of third-party programs in a registry; and     identifying a plurality of third-party programs associated with the triggering condition comprises:

comparing the at least one of the events with the triggering condition.

12. The non-transitory computer readable medium as recited in claim 9, wherein the response from the responding third-party programs comprises services provided by the responding third-party program.

13. The non-transitory computer readable medium of claim 9, wherein the triggering condition comprises a detection of a foreign language in the existing chat session.

14. The non-transitory computer readable medium of claim 9, wherein the triggering condition comprises weather at a location of the existing participant.

15. An apparatus for invoking a third-party program as an additional participant of a chat session, comprising:

a processor; and a memory to store computer program instructions, the computer program instructions when executed on the processor cause the processor to perform operations comprising:

monitoring events of an existing chat session of a messaging platform;

determining that at least one of the events of the existing chat session satisfies a triggering condition;

identifying a plurality of third-party programs associated with the triggering condition;

transmitting a notification to each of the identified third-party programs indicating that the identified third-party program is associated with the triggering condition satisfied by the at least one of the events;

receiving a response from responding third-party programs indicating that the responding third-party program is interested in being invoked as an additional participant in the existing chat session;

ranking and filtering the responding third-party programs based on a selection criteria to determine a ranked subset of the responding third-party programs;

presenting the ranked subset of the responding third-party programs to an existing participant of the existing chat session based on the selection criteria;

in response to receiving a selection of one of the responding third-party programs from the existing participant of the existing chat session, invoking the selected third-party program as the additional participant of the existing chat session; and         sending data associated with the at least one of the events of the existing chat session to the selected third-party program, wherein the selected third-party program performs a function in the existing chat session based on 1) the data associated with the at least one of the events and 2) interactions between the selected third-party program and the existing participant in the existing chat session.

16. The apparatus as recited in claim 15, the operations further comprising registering the plurality of third-party programs with the triggering condition.

17. The apparatus as recited in claim 15, wherein the triggering condition comprises at least one of an event, a criteria, or a state relating to the existing chat session.

18. The apparatus as recited in claim 15, wherein the triggering condition comprises a keyword referred to in the existing chat session.

19. The apparatus of claim 15, wherein the triggering condition comprises a detection of a foreign language in the existing chat session.

20. The apparatus of claim 15, wherein the triggering condition comprises weather at a location of the existing participant.

* * * * *